US008621736B1

(12) United States Patent  (10) Patent No.: US 8,621,736 B1
Hall  (45) Date of Patent: Jan. 7, 2014

(54) ALIGNMENT CLAMP ASSEMBLY

(76) Inventor: Michael L. Hall, Warrensville Heights, OH (US)

(*) Notice: Subject to any disclaimer, the term of this patent is extended or adjusted under 35 U.S.C. 154(b) by 230 days.

(21) Appl. No.: 13/112,415

(22) Filed: May 20, 2011

(51) Int. Cl.
B25B 27/14 (2006.01)
(52) U.S. Cl.
USPC ............ 29/271; 269/6; 30/363; 7/127; 81/422
(58) Field of Classification Search
USPC ............ 269/3, 6, 270–271, 280; 30/358, 363;
7/127–130, 132, 133; 81/421–424;
29/270–271, 280
See application file for complete search history.

(56) References Cited

U.S. PATENT DOCUMENTS

| | | | | |
|---|---|---|---|---|
| 15,795 A * | 9/1856 | Simpson | .......................... | 30/363 |
| 18,206 A * | 9/1857 | Lamson | ............................. | 7/128 |
| 326,429 A * | 9/1885 | Hansoom | ........................ | 30/363 |
| 519,939 A * | 5/1894 | Boeri | ............................. | 99/544 |
| 645,927 A * | 3/1900 | Harmon | .......................... | 30/363 |
| 665,052 A * | 1/1901 | Bernard | .......................... | 30/363 |
| 961,800 A * | 6/1910 | Rogers | .......................... | 606/116 |
| 974,368 A * | 11/1910 | Eaton | ............................. | 29/268 |
| 1,016,752 A * | 2/1912 | Leith | ............................. | 30/363 |
| 1,139,938 A * | 5/1915 | Weinstein | ..................... | 227/144 |
| 1,176,793 A * | 3/1916 | Tuttle | ............................. | 29/21.1 |
| 1,464,807 A * | 8/1923 | Clark | ............................. | 433/144 |
| 1,679,039 A * | 7/1928 | Kucera | .......................... | 30/363 |
| 1,795,054 A * | 3/1931 | Summers | ........................ | 81/456 |
| 2,191,382 A * | 2/1940 | Hart | .............................. | 30/363 |
| 2,301,833 A * | 11/1942 | Van Sittert | ................... | 269/48.2 |
| 2,352,917 A * | 7/1944 | Scott | .............................. | 81/421 |
| 2,837,948 A * | 6/1958 | Erdmann | ......................... | 29/268 |
| 2,838,973 A * | 6/1958 | Petersen | ......................... | 81/370 |
| 3,015,161 A * | 1/1962 | Semler et al. | ................... | 30/363 |
| 3,132,343 A * | 5/1964 | Kahn | ............................. | 227/144 |
| 3,386,318 A | 6/1968 | Pekarcik et al. | | |
| 3,395,724 A * | 8/1968 | Hamel | .......................... | 137/318 |
| 3,517,874 A * | 6/1970 | Cressy | .......................... | 227/144 |
| 3,698,419 A * | 10/1972 | Tura | ............................. | 137/318 |
| 3,826,160 A | 7/1974 | Allen et al. | | |
| 4,208,749 A * | 6/1980 | Hermann et al. | ................. | 7/106 |
| 4,583,671 A * | 4/1986 | Cressy | .......................... | 227/144 |
| 4,601,618 A | 7/1986 | McEldowney | | |
| 4,881,434 A * | 11/1989 | Keller | ............................. | 81/426 |
| 4,982,631 A * | 1/1991 | Lowther | ......................... | 81/426 |
| 4,991,471 A * | 2/1991 | Herrmann | ...................... | 81/426 |
| 5,020,202 A | 6/1991 | Turrell | | |
| 5,022,253 A * | 6/1991 | Parlatore | ........................ | 72/325 |
| 5,056,385 A * | 10/1991 | Petersen | ......................... | 81/370 |
| 5,163,792 A | 11/1992 | Slavik | | |
| 5,285,703 A * | 2/1994 | Carson | .......................... | 81/423 |
| 5,291,914 A * | 3/1994 | Bares et al. | ................. | 137/15.13 |
| 5,301,532 A * | 4/1994 | Bickmore et al. | .............. | 72/325 |
| 5,373,866 A * | 12/1994 | Whalen, II | .................... | 137/318 |

(Continued)

*Primary Examiner* — Lee D Wilson
*Assistant Examiner* — Tyrone V Hall, Jr.

(57) ABSTRACT

An alignment clamp assembly is provided for aligning and holding flanged or framed ductwork while the ductwork is being joined together. The assembly includes an upper jaw having a planar end portion and a lower jaw pivotally coupled to the upper jaw. The lower jaw has a planar end surface and is pivotable to position the end portion of the upper jaw against the end surface of the lower jaw. A pin is coupled to one of the upper jaw and the lower jaw. A cavity is positioned in one of the upper jaw and the lower jaw opposite the pin. The pin extends into the cavity when the end portion of the upper jaw is positioned against the end surface of the lower jaw.

8 Claims, 3 Drawing Sheets

(56) References Cited

U.S. PATENT DOCUMENTS

| | | | |
|---|---|---|---|
| 5,884,540 A * | 3/1999 | Mo | 81/423 |
| 6,626,070 B2 * | 9/2003 | Peperkorn et al. | 81/370 |
| 7,322,088 B2 * | 1/2008 | Sullivan et al. | 29/268 |
| D584,584 S | 1/2009 | Pieper | |
| 2003/0066186 A1 * | 4/2003 | Lu | 29/758 |
| 2005/0050740 A1 * | 3/2005 | Lin | 30/363 |

* cited by examiner

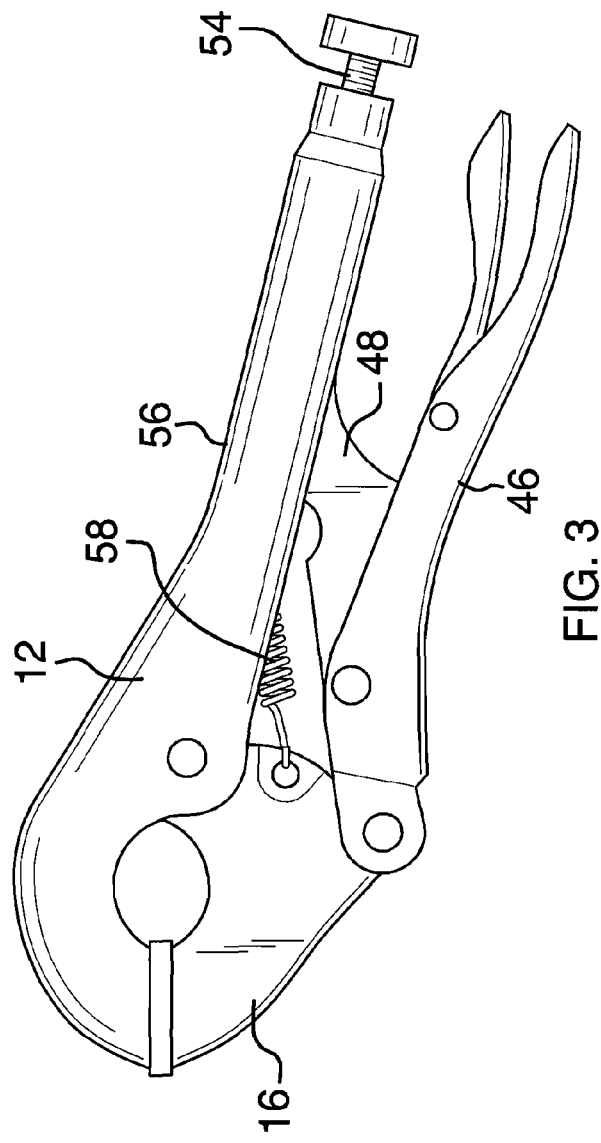
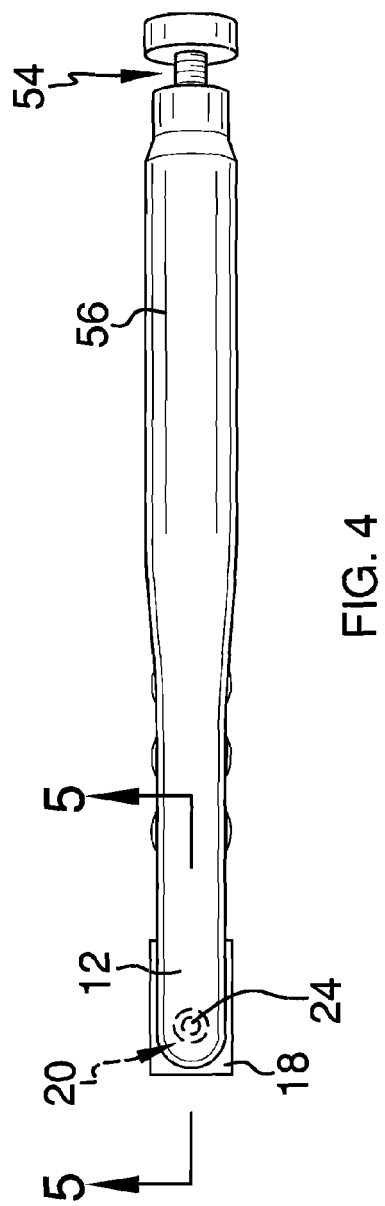
FIG. 3
FIG. 4

ALIGNMENT CLAMP ASSEMBLY

BACKGROUND OF THE DISCLOSURE

Field of the Disclosure

The disclosure relates to clamping devices and more particularly pertains to a new clamping device for aligning and holding flanged or framed ductwork while the ductwork is being joined together.

SUMMARY OF THE DISCLOSURE

An embodiment of the disclosure meets the needs presented above by generally comprising an upper jaw having a planar end portion and a lower jaw pivotally coupled to the upper jaw. The lower jaw has a planar end surface and is pivotable to position the end portion of the upper jaw against the end surface of the lower jaw. A pin is coupled to one of the upper jaw and the lower jaw. A cavity is positioned in one of the upper jaw and the lower jaw opposite the pin. The pin extends into the cavity when the end portion of the upper jaw is positioned against the end surface of the lower jaw.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a side view of an embodiment of the disclosure.

FIG. 4 is a top view of an embodiment of the disclosure.

DESCRIPTION OF THE PREFERRED EMBODIMENT

Figure 1:
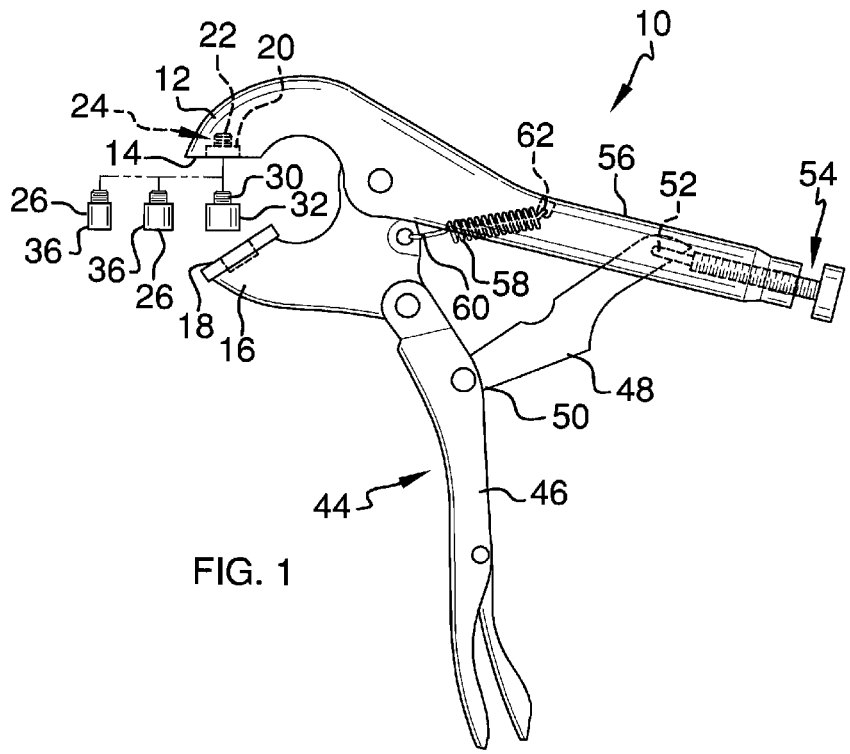
FIG. 1 is a side view of a alignment clamp assembly according to an embodiment of the disclosure.
Figure 5:
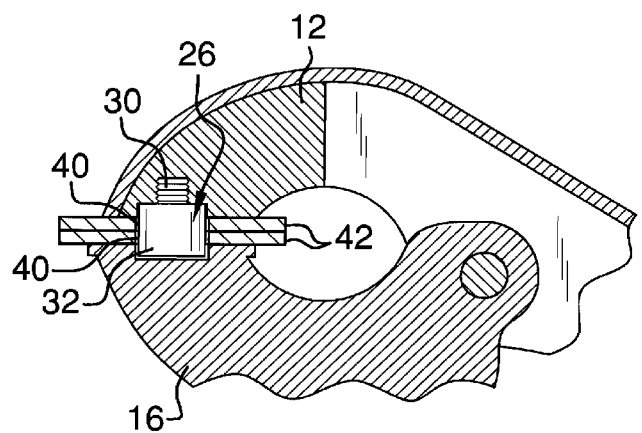
FIG. 5 is a cross-sectional view of an embodiment of the disclosure taken along line 5-5 of FIG. 4.
Figure 2:
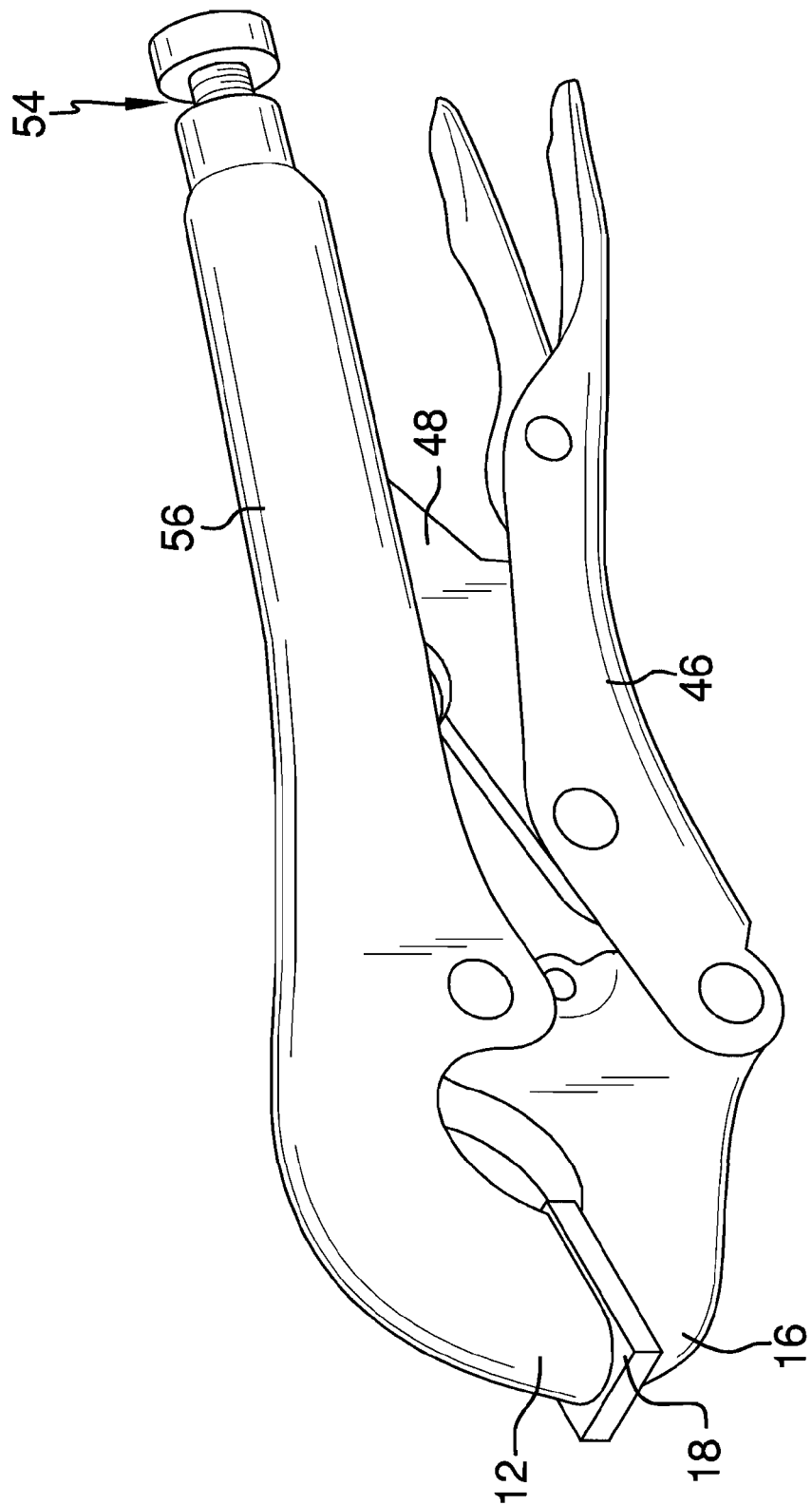
FIG. 2 is a top front side perspective view of an embodiment of the disclosure.

With reference now to the drawings, and in particular to FIGS. 1 through 5 thereof, a new clamping device embodying the principles and concepts of an embodiment of the disclosure and generally designated by the reference numeral 10 will be described.

As best illustrated in FIGS. 1 through 5, the alignment clamp assembly 10 generally comprises an upper jaw 12 which has a planar end portion 14. A lower jaw 16 is pivotally coupled to the upper jaw 12. The lower jaw 16 has a planar end surface 18. The lower jaw 16 is pivotable to position the end portion 14 of the upper jaw 12 against the end surface 18 of the lower jaw 16. A hole 20 extends into the upper jaw 12, the hole has threading 22 that may be in an inset portion 24 of the hole 20. A pin 26 is coupled to the upper jaw 12. The pin 26 has a threaded connection portion 30 and a main portion 32. The connection portion 30 of the pin 26 extends from the main portion 32 of the pin 26. The connection portion 32 is positioned in and engages the hole 20 extending into the upper jaw 12. The pin 26 is one of a plurality of interchangeable pins 26, each having a main portion 32. The main portion 32 of each pin 26 has a circular cross-section 34. The outer diameter 36 of each main portion 32 varies from other the main portions 32 of the pins 26.

A cavity 28 is positioned in the lower jaw 16 opposite the pin 26 whereby the pin 26 extends into the cavity 28 when the end portion 14 of the upper jaw 12 is positioned against the end surface 18 of the lower jaw 16. Thus, the pin 26 extends between the end portion 14 of the upper jaw 12 and the end surface 18 of the lower jaw 16 and may be used to align two pieces of material 42 clamped between the upper jaw 12 and the lower jaw 16 by insertion of the pin 26 through holes 40 in the materials 42. Alternatively, the clamping assembly 10 may be effective reversing the coupling of the pin 26 to the lower jaw 16 and positioning the cavity 28 in the upper jaw 12.

A locking mechanism 44 may be operationally coupled to the upper jaw 12 and the lower jaw 16 whereby the end portion 14 of the upper jaw 12 is held in a static position relative to the end surface 18 of the lower jaw 16 by the locking mechanism 44. The locking mechanism 44 includes a handle arm 46 and a bracing arm 48. The handle arm 46 is pivotally coupled to the lower jaw 16. The bracing arm 48 has a first end 50 pivotally coupled to the handle arm 46 and a second end 52 pivotally coupled to the upper jaw 12.

An adjustment mechanism 54 is coupled to the upper jaw 12 and the second end 52 of the bracing arm 48. The adjustment mechanism 54 adjusts a position of the second end 52 of the bracing arm 48 along a length of a handle portion 56 the upper jaw 12. The adjustment mechanism 54 adjusts spacing between the end portion 14 of the upper jaw 12 and the end surface 18 of the lower jaw 16 when the upper jaw 12 is fully pivoted towards the lower jaw 16. The spacing is selectable by adjustment of the adjustment mechanism 54 as in conventional vice grip pliers.

A biasing member 58 has a first end 60 coupled to the lower jaw 16 and a second end 62 coupled to the upper jaw 12 along the handle portion 56. The biasing member 58 urges the end portion 14 of the upper jaw 12 away from the end surface 18 of the lower jaw 16 when the locking mechanism 44 is disengaged.

In use, the assembly 10 clamps and holds materials 42 together and in alignment by insertion of the pin 26 through the holes 40 in the materials 42. The materials 42 may be flanged ductwork, framed ductwork, or sheet metal. The proper pin 26 is selected depending on the hole size of the materials 42. The materials 42 are then aligned and clamped together. The materials 42 may then be otherwise coupled to each other as desired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An alignment clamp assembly comprising:
   an upper jaw, said upper jaw having a planar end portion;
   a lower jaw pivotally coupled to said upper jaw, said lower jaw having a planar end surface, said lower jaw being pivotable to position said end portion of said upper jaw against said end surface of said lower jaw;
   a pin coupled to one of said upper jaw and said lower jaw, said pin having a main portion, said main portion of said pin having a circular cross-section, said main portion having a flat outer face relative to said one of said upper jaw and said lower jaw;
   a cavity being positioned in one of said upper jaw and said lower jaw opposite said pin whereby said pin extends into said cavity transverse to said end portion of said upper jaw and said end surface of said lower jaw when said end portion of said upper jaw is positioned against said end surface of said lower jaw, said cavity having a planar outer edge, said cavity having an interior edge positioned within said one of said upper jaw and said lower jaw, said interior edge defining a closed end of said cavity within said one of said upper jaw and said lower jaw; and
   a locking mechanism operationally coupled to said upper jaw and said lower jaw whereby said end portion of said upper jaw is held in a static position relative to said end surface of said lower jaw by said locking mechanism.

2. The assembly of claim 1, wherein said locking mechanism includes a handle arm and a bracing arm, said handle arm being pivotally coupled to said lower jaw, said bracing arm having a first end pivotally coupled to said handle arm and a second end pivotally coupled to said upper jaw.

3. The assembly of claim 2, further including an adjustment mechanism coupled to said upper jaw and said second end of said bracing arm, said adjustment mechanism adjusting a position of said second end of said bracing arm along a length of said upper jaw whereby spacing between said end portion of said upper jaw and said end surface of said lower jaw when said upper jaw if fully pivoted towards said lower jaw is selectable by adjustment of said adjustment mechanism.

4. The assembly of claim 1, further comprising:
   said pin being coupled to said upper jaw and said cavity being positioned in said lower jaw;
   a hole extending into said upper jaw; and
   said pin having a connection portion, said connection portion of said pin extending outwardly from said main portion of said pin, said connection portion being positioned in and engaged to said hole extending into said upper jaw.

5. The assembly of claim 1, further including a biasing member having a first end coupled to said lower jaw and a second end coupled to said upper jaw, said biasing member urging said end portion of said upper jaw away from said end surface of said lower jaw when said locking mechanism is disengaged.

6. An alignment clamp assembly comprising:
   an upper jaw, said upper jaw having a planar end portion;
   a lower jaw pivotally coupled to said upper jaw, said lower jaw having a planar end surface, said lower jaw being pivotable to position said end portion of said upper jaw against said end surface of said lower jaw;
   a pin coupled to one of said upper jaw and said lower jaw, said pin having a main portion, said main portion of said pin having a circular cross-section, said main portion having a flat outer face relative to said one of said upper jaw and said lower jaw;
   a cavity being positioned in one of said upper jaw and said lower jaw opposite said pin whereby said pin extends into said cavity transverse to said end portion of said upper jaw and said end surface of said lower jaw when said end portion of said upper jaw is positioned against said end surface of said lower jaw, said cavity having a planar outer edge, said cavity having an interior edge positioned within said one of said upper jaw and said lower jaw, said interior edge defining a closed end of said cavity within said one of said upper jaw and said lower jaw;
   said pin being coupled to said upper jaw and said cavity being positioned in said lower jaw;
   a hole extending into said upper jaw;
   said pin having a connection portion, said connection portion of said pin extending outwardly from said main portion of said pin, said connection portion being positioned in and engaged to said hole extending into said upper jaw; and
   wherein said hole is threaded and said connection portion of said pin is threaded.

7. An alignment clamp assembly comprising:
   an upper jaw, said upper jaw having a planar end portion;
   a lower jaw pivotally coupled to said upper jaw, said lower jaw having a planar end surface, said lower jaw being pivotable to position said end portion of said upper jaw against said end surface of said lower jaw;
   a pin coupled to one of said upper jaw and said lower jaw, said pin having a main portion, said main portion of said pin having a circular cross-section, said main portion having a flat outer face relative to said one of said upper jaw and said lower jaw;
   a cavity being positioned in one of said upper jaw and said lower jaw opposite said pin whereby said pin extends into said cavity transverse to said end portion of said upper jaw and said end surface of said lower jaw when said end portion of said upper jaw is positioned against said end surface of said lower jaw, said cavity having a planar outer edge, said cavity having an interior edge positioned within said one of said upper jaw and said lower jaw, said interior edge defining a closed end of said cavity within said one of said upper jaw and said lower jaw; and
   said pin being one of a plurality of interchangeable pins, said main portion of each said pin having said circular cross-section, an outer diameter of each said main portion varying from other said main portions of said pins.

8. An alignment clamp assembly comprising:
   an upper jaw, said upper jaw having a planar end portion;
   a lower jaw pivotally coupled to said upper jaw, said lower jaw having a planar end surface, said lower jaw being pivotable to position said end portion of said upper jaw against said end surface of said lower jaw;
   a hole extending into said upper jaw, said hole having threading;
   a pin coupled to said upper jaw, said pin being coupled to said upper jaw, said pin having a threaded connection portion and a main portion, said main portion having a flat outer face, said connection portion of said pin extending from said main portion of said pin, said connection portion being positioned in and engaged to said hole extending into said upper jaw, said pin being one of a plurality of interchangeable pins, each of said pins having a main portion, said main portion of each said pin having a circular cross-section, an outer diameter of each said main portion varying from other said main portions of said pins;

a cavity being positioned in said lower jaw opposite said pin whereby said pin extends transverse to said end portion of said upper jaw and said end surface of said lower jaw into said cavity when said end portion of said upper jaw is positioned against said end surface of said lower jaw, said cavity having a planar outer edge, said outer edge of said cavity being coplanar with said planar end surface of said lower jaw, said cavity having an interior edge positioned within said lower jaw, said interior edge defining a closed end of said cavity within said lower jaw;

a locking mechanism operationally coupled to said upper jaw and said lower jaw whereby said end portion of said upper jaw is held in a static position relative to said end surface of said lower jaw by said locking mechanism, said locking mechanism including a handle arm and a bracing arm, said handle arm being pivotally coupled to said lower jaw, said bracing arm having a first end pivotally coupled to said handle arm and a second end pivotally coupled to said upper jaw;

an adjustment mechanism coupled to said upper jaw and said second end of said bracing arm, said adjustment mechanism adjusting a position of said second end of said bracing arm along a length of said upper jaw whereby spacing between said end portion of said upper jaw and said end surface of said lower jaw when said upper jaw if fully pivoted towards said lower jaw is selectable by adjustment of said adjustment mechanism; and a biasing member having a first end coupled to said lower jaw and a second end coupled to said upper jaw, said biasing member urging said end portion of said upper jaw away from said end surface of said lower jaw when said locking mechanism is disengaged.

\* \* \* \* \*